(12) United States Patent
Som

(10) Patent No.: US 10,541,080 B2
(45) Date of Patent: Jan. 21, 2020

(54) INDUCTOR, IN PARTICULAR FOR MAGNETICALLY COUPLED ENERGY TRANSFER, AS WELL AS METHOD FOR OPERATING AN INDUCTOR OF THIS TYPE

(71) Applicant: Würth Elektronik eiSos GmbH & Co. KG, Waldenburg (DE)

(72) Inventor: Cem Som, Zorneding (DE)

(73) Assignee: Würth Elektronik eiSos GmbH & Co. KG, Waldenburg (DE)

( * ) Notice: Subject to any disclaimer, the term of this patent is extended or adjusted under 35 U.S.C. 154(b) by 260 days.

(21) Appl. No.: 15/548,972

(22) PCT Filed: Feb. 1, 2016

(86) PCT No.: PCT/EP2016/052039
§ 371 (c)(1),
(2) Date: Aug. 4, 2017

(87) PCT Pub. No.: WO2016/124526
PCT Pub. Date: Aug. 11, 2016

(65) Prior Publication Data
US 2018/0025838 A1 Jan. 25, 2018

(30) Foreign Application Priority Data
Feb. 5, 2015 (DE) .......... 10 2015 202 032

(51) Int. Cl.
*H01H 47/00* (2006.01)
*H01F 38/14* (2006.01)
*H02J 50/10* (2016.01)
*H01F 27/24* (2006.01)
(Continued)

(52) U.S. Cl.
CPC ............. *H01F 38/14* (2013.01); *H01F 27/24* (2013.01); *H01F 27/28* (2013.01); *H01F 27/346* (2013.01); *H02J 50/10* (2016.02)

(58) Field of Classification Search
None
See application file for complete search history.

(56) References Cited

U.S. PATENT DOCUMENTS

| | | | |
|---|---|---|---|
| 6,407,987 B1 * | 6/2002 | Abraham | H02J 13/0031 340/12.38 |
| 7,053,746 B2 * | 5/2006 | Widiger | F02P 3/02 336/90 |
| 2004/0108311 A1 | 6/2004 | de Rooij et al. | |

FOREIGN PATENT DOCUMENTS

| | | |
|---|---|---|
| CN | 202 178 888 U | 3/2012 |
| DE | 103 25 227 A1 | 1/2005 |
| EP | 0 158 353 A2 | 10/1985 |

(Continued)

*Primary Examiner* — Stephen W Jackson
(74) *Attorney, Agent, or Firm* — McGlew and Tuttle, P.C.

(57) ABSTRACT

An inductor, in particular for magnetically coupled energy transfer, includes a coil carrier on which a first coil and a second coil are arranged. The second coil has an outer diameter $D_2$ that is greater than an outer diameter $D_1$ of the first coil. A magnetic core surrounds a longitudinal center axis of the first coil. The first coil is operated with a first operating frequency in a first power range, whereas the second coil is operated independently of the first coil with a second operating frequency in a second power range. As a result applications can be run in a simple and flexible manner in a low-power range and in a high-power range.

15 Claims, 7 Drawing Sheets

(51) Int. Cl.
*H01F 27/28* (2006.01)
*H01F 27/34* (2006.01)

(56) References Cited

FOREIGN PATENT DOCUMENTS

| | | |
|---|---|---|
| EP | 1 560 462 A2 | 8/2005 |
| EP | 2 170 010 A2 | 3/2010 |
| EP | 2405714 A1 | 1/2012 |
| EP | 2 490 505 A1 | 8/2012 |
| EP | 2 770 801 A1 | 8/2014 |
| EP | 2 991 185 A2 | 3/2016 |
| JP | 2008-053056 A | 3/2008 |
| JP | 2008-117638 A | 5/2008 |
| JP | 2011-517926 A | 6/2011 |
| JP | 2013-101981 A | 5/2013 |
| KR | 10-2010-0130985 A | 12/2010 |
| KR | 10-2013-0060355 A | 6/2013 |
| WO | 94/05137 A1 | 3/1994 |
| WO | 2009114671 A1 | 9/2009 |

* cited by examiner

ND PATENT APPLICATION CONVERTED

INDUCTOR, IN PARTICULAR FOR MAGNETICALLY COUPLED ENERGY TRANSFER, AS WELL AS METHOD FOR OPERATING AN INDUCTOR OF THIS TYPE

CROSS REFERENCE TO RELATED APPLICATIONS

This application is a United States National Phase application of International Application PCT/EP2016/052039 filed Feb. 1, 2016 and claims the benefit of priority under 35 U.S.C. § 119 of German patent application 10 2015 202 032.0 filed Feb. 5, 2015, the entire contents of which are incorporated herein by reference.

FIELD OF THE INVENTION

The invention relates to an inductor, in particular for magnetically coupled energy transfer, the inductor including:
  a coil carrier,
  a first coil arranged on the coil carrier for energy transfer in a first power range that has a first outer diameter $D_1$, and
  a second coil arranged on the coil carrier for energy transfer in a second power range that has a second outer diameter $D_2$, wherein the second outer diameter $D_2$ is larger than the first outer diameter $D_1$.

The invention further relates to a method for the operation of an inductor, in particular for magnetically coupled energy transfer. The inductor is in particular to be used for applications in the domestic sector, in particular in an induction cooking hob.

BACKGROUND OF THE INVENTION

An inductor for an induction cooking hob that comprises a coil carrier on which an induction coil is arranged is known from EP 1 560 462 A2. The inductor further comprises a plurality of ferrite rods that run radially with respect to a longitudinal center axis of the induction coil, and which act to complete the magnetic circuit.

SUMMARY OF THE INVENTION

The invention is based on an object of creating a inductor that can be employed in a flexible and efficient manner. The inductor is in particular to be usable for magnetically coupled energy transfer.

This object is achieved by an inductor comprising a magnetic core that surrounds a longitudinal center axis of the first coil. The inductor comprises at least two coils or induction coils, wherein the first coil is operable or is operated with a first operating frequency $F_1$ in a first power range, and the second coil is operable or is operated with a second operating frequency $F_2$ in a second power range. The operating frequencies $F_1$ and $F_2$ are in particular unequal. The first coil is used for inductive energy transfer in a low-power range, whereas the second coil is used for inductive energy transfer in a high-power range. The following applies for a transferred power $P_1$ of the first coil in the low-power range: $0\ W \le P_1 \le 300\ W$, in particular $0\ W \le P_1 \le 250\ W$, and in particular $0\ W \le P_1 \le 200\ W$. In contrast, the following applies for a transferred power $P_2$ of the second coil and, if relevant, a third coil, in the high-power range: $200\ W \le P_2 \le 4.0\ kW$, in particular $250\ W \le P_2 \le 3.3\ kW$, and in particular $300\ W \le P_2 \le 2.4\ kW$. Through the combination of the coils, very diverse applications with different required power classes can be operated in a flexible manner. Since the coils are operated independently of one another, i.e. not simultaneously, a mutual influence between the coils is avoided, whereby a high efficiency is achieved in the respective power range. The first coil can, for example, be used for wireless charging of a mobile telephone, whereas the second coil can be used for the operation of devices with higher power, such as for example kitchen appliances or robot vacuum cleaners.

To achieve the different power ranges, the external diameter $D_2$ of the second coil is greater than the external diameter $D_1$ of the first coil. The following applies in particular to the external diameter $D_1$: $10\ mm \le D_1 \le 60\ mm$, in particular $15\ mm \le D_1 \le 55\ mm$, and in particular $20\ mm \le D_1 \le 50\ mm$. The following applies in particular to the external diameter $D_2$: $100\ mm \le D_2 \le 180\ mm$, in particular $110\ mm \le D_2 \le 160\ mm$, and in particular $120\ mm \le D_2 \le 140\ mm$. For an internal diameter $d_2$ of the second coil, $d_2 > D_1$ preferably applies.

The first coil, further, has a first inductance $L_1$, to which the following preferably applies: $1\ \mu H \le L_1 \le 100\ \mu H$, in particular $4\ \mu H \le L_1 \le 50\ \mu H$, and in particular $5\ \mu H \le L_1 \le 25\ \mu H$. The second coil, correspondingly, has a second inductance $L_2$, to which the following preferably applies: $50\ \mu H \le L_2 \le 150\ \mu H$, in particular $70\ \mu H \le L_2 \le 130\ \mu H$, and in particular $90\ \mu H \le L_2 \le 120\ \mu H$.

The inductor ensures a high efficiency. The magnetic field lines are guided better by the magnetic core, whereby the stray field is reduced. The magnetic core can be designed as one piece, or can be composed of a plurality of core elements. The magnetic core is preferably a ferrite core. The magnetic core can have an arbitrary closed form. The magnetic core has, for example, a polygonal, round, semi-circular, oval or half-oval cross-sectional shape.

An inductor comprising a control unit that is designed such that the first coil and the second coil are operated independently, in particular exclusively independently, of one another, ensures a high efficiency. The control unit ensures that the first coil and the second coil are operated independently, in particular exclusively independently, of one another. This means in particular that either the first coil or the second coil is in operation. The control unit thus prevents the first coil and the second coil from being operated simultaneously.

An inductor comprising a control unit that is designed such that the first coil is operated with a first operating frequency $F_1$, where the following applies to the first operating frequency $F_1$: $100\ kHz \le F_1 \le 220\ kHz$, in particular $110\ kHz \le F_1 \le 210\ kHz$, and in particular $120\ kHz \le F_1 \le 200\ kHz$, ensures an efficient operation in the low-power range. The voltage $U_1$ applied to the first coil has an amplitude between 0 V and 50 V. The current $I_1$ flowing through the first coil has an amplitude between 0 A and 15 A.

An inductor comprising a control unit that is designed such that the second coil is operated with a second operating frequency $F_2$, where the following applies to the second operating frequency $F_2$: $40\ kHz \le F_2 \le 250\ kHz$, in particular $50\ kHz \le F_2 \le 200\ kHz$, and in particular $60\ kHz \le F_2 \le 120\ kHz$, ensures a high efficiency when operating the second coil in the high-power range. The voltage $U_2$ applied to the second coil has an amplitude between 0 V and 240 V. The current $I_2$ flowing through the second coil has an amplitude between 0 A and 30 A.

An inductor comprising a third coil arranged on the coil carrier, that has an outer diameter $D_3$ that is greater than the outer diameter $D_2$, increases the flexibility in an application in the high-power range. Through the third coil, the high-power range is extended or fully exploited. The following preferably applies to the external diameter $D_3$: 160 mm≤$D_3$≤250 mm, in particular 170 mm≤$D_3$≤240 mm, and in particular 180 mm≤$D_3$≤230 mm. The third coil further has a third inner diameter $d_3$, wherein preferably $d_3$>$D_2$. The third coil has a third inductance $L_3$, to which the following preferably applies: 20 µH≤$L_3$≤100 µH, in particular 30 µH≤$L_3$≤90 µH, and in particular 50 µH≤$L_3$≤80 µH.

The third coil can be operated depending on the second coil. The third coil is for example connected in series or in parallel with the second coil to increase the power. Preferably the third coil is exclusively operable together with the second coil. In contrast, the first coil is operable independently, in particular exclusively independently, of the second coil and the third coil. For this purpose the inductor comprises in particular a control unit that is appropriately designed.

An inductor, in which the magnetic core is designed in one piece, in particular as an annular core, ensures a high efficiency, since the field lines are guided in an optimum manner. The core preferably has a closed round or polygonal, in particular rectangular, shape. The magnetic core is preferably designed as an annular core, in particular as an annular ferrite core.

An inductor, in which the magnetic core is composed of a plurality of core elements, ensures a high efficiency. Because the magnetic core is composed of a plurality of core elements, the shape can be assembled in a simple and flexible manner from core elements that are technically easy to manufacture and which can be optimized as needed. The core elements can, for example, be designed as rods, which can be assembled into a core formed as a polygon. The core elements can, furthermore, be designed as circular arcs, for example as quarter-circle or half-circle arcs, and assembled into an annular core. The core elements are preferably designed as ferrite core elements.

An inductor, in which the magnetic core surrounds the first coil, and in particular is arranged between the first coil and the second coil, ensures a high efficiency both when operating the first coil in the low-power range and when operating the second coil in the high-power range. Preferably the magnetic core is designed as an annular core, in particular as an annular ferrite core, where the following applies for an inner diameter $d_K$ of the annular core: $d_K$>$D_1$. Furthermore, for an outer diameter $D_K$ of the annular core and an inner diameter $d_2$ of the second coil preferably the following applies: $d_2$>$D_K$.

An inductor, in which the magnetic core and/or the coils are arranged on a first face, in particular on an upper face, of the coil carrier, ensures a high efficiency. Preferably the magnetic core and the coils are arranged on the upper face of the coil carrier. In, for example, a kitchen application, the upper face is mounted immediately underneath a work surface or is inset into a work surface.

An inductor comprising a plurality of magnetic rods that are arranged radially to a longitudinal center axis of the first coil ensures a high efficiency. The magnetic rods permit a better guidance of the field lines, whereby the stray field is reduced. Preferably the magnetic rods are designed as ferrite rods. The rods are, in particular, arranged with rotational symmetry around the longitudinal center axis. Preferably the inductor comprises 3 to 48, in particular 4 to 36, and in particular 6 to 24 rods.

An inductor, in which a plurality of magnetic rods are arranged on a second face, in particular on a lower face, of the coil carrier, ensures a high efficiency. The magnetic field is screened at the second face, in particular at the lower face, through the arrangement of the magnetic rods. Preferably the magnetic core is arranged on an upper face and the magnetic rods on a lower face of the coil carrier. In addition or as an alternative to the magnetic rods, the second face of the coil carrier can be provided with a screen material.

An inductor, in which the magnetic rods extend into a receptacle region of the second coil and/or of the third coil, in particular outside a receptacle region of the first coil, ensures a high efficiency in the high-power range.

An inductor, in which the coil carrier has a plurality of apertures for cooling at least one of the coils, improves the thermal behavior, whereby a high efficiency is achieved. The apertures can be designed as holes and/or slots. The inductor can, in addition, comprise a fan that cools at least one coil in combination with the apertures. Preferably the apertures are designed in the region of the second coil and/or of the third coil.

An inductor, in which at least one of the coils is spiral in design, ensures a high flexibility and efficiency. Due to the spiral formation of the first coil and/or of the second coil and/or, if relevant, of the third coil, a desired number of windings of the respective coil can be achieved in combination with a relatively flat design of the respective coil. The respective coil can be wound spirally in a single plane or a plurality of planes. The respective coil is wound spirally in at most eight planes, in particular in at most six planes, and in particular in at most four planes. The respective coil has a constant winding density in the radial direction.

The invention is further based on an object of creating a method for the operation of such an inductor, which can be employed in a flexible and efficient manner.

This object is achieved by a method the operation of an inductor, in particular for magnetically coupled energy transfer, with the steps:

provision of an inductor with a first coil and a second coil and a magnetic core that surrounds a longitudinal center axis of the first coil, operation of the first coil with a first operating frequency $F_1$ in a first power range, and operation of the second coil independently of the first coil with a second operating frequency $F_2$ in a second power range.

The advantages of the method according to the invention correspond to the advantages of the inductor according to the invention already described. Due to the mutually independent operation of the coils, that is to say in particular the exclusively non-simultaneous operation of the coils with operating frequencies $F_1$ and $F_2$, no mutual influence of the inductive energy transfer occurs when operating the first coil or when operating the second coil. As a result applications can be run in a simple and flexible manner in a low-power range and in a high-power range. The method according to the invention can, in particular, also be developed with the features of the inductor according to the invention.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
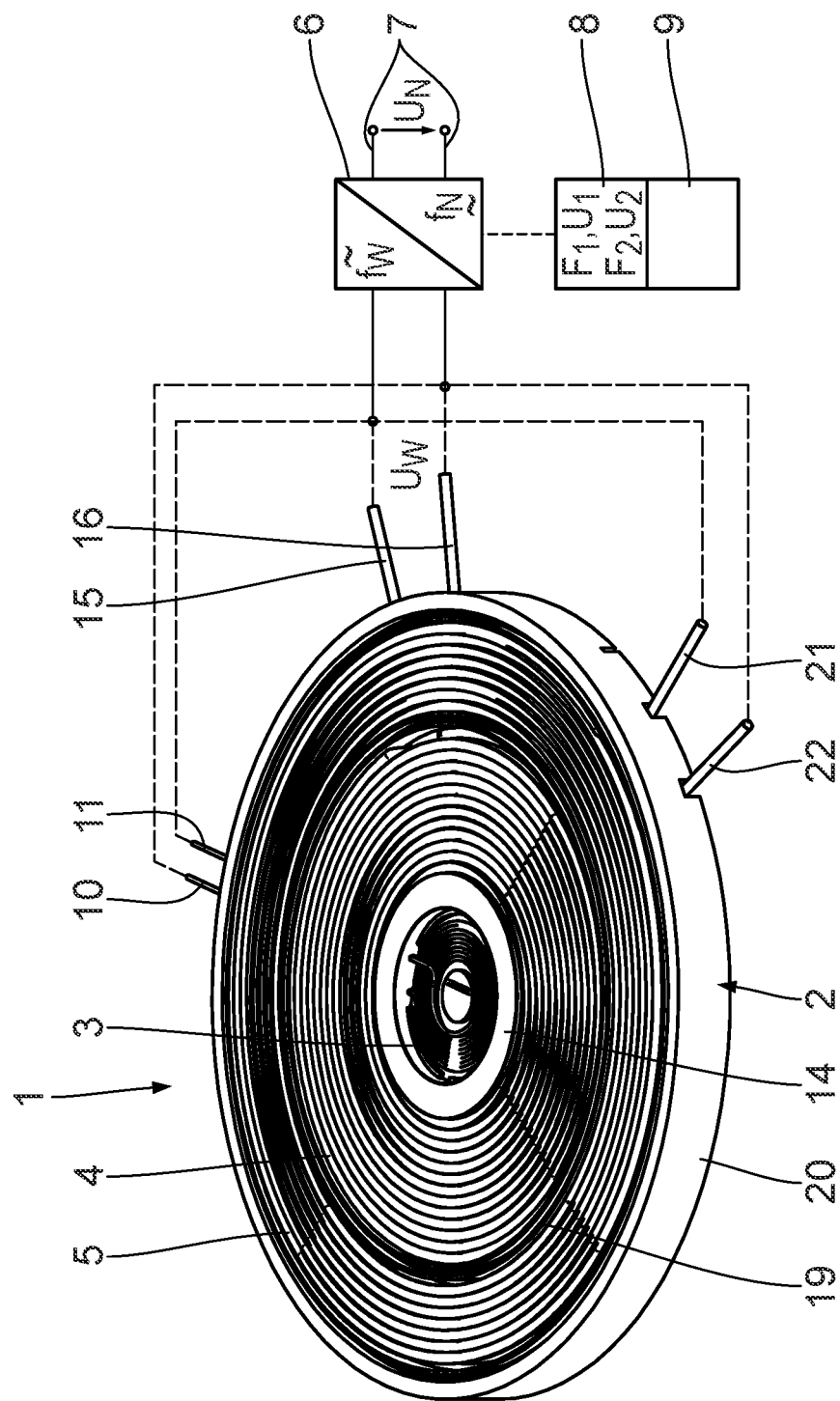
FIG. 1 is a schematic view of an inductor according to a first exemplary embodiment.
Figure 2:
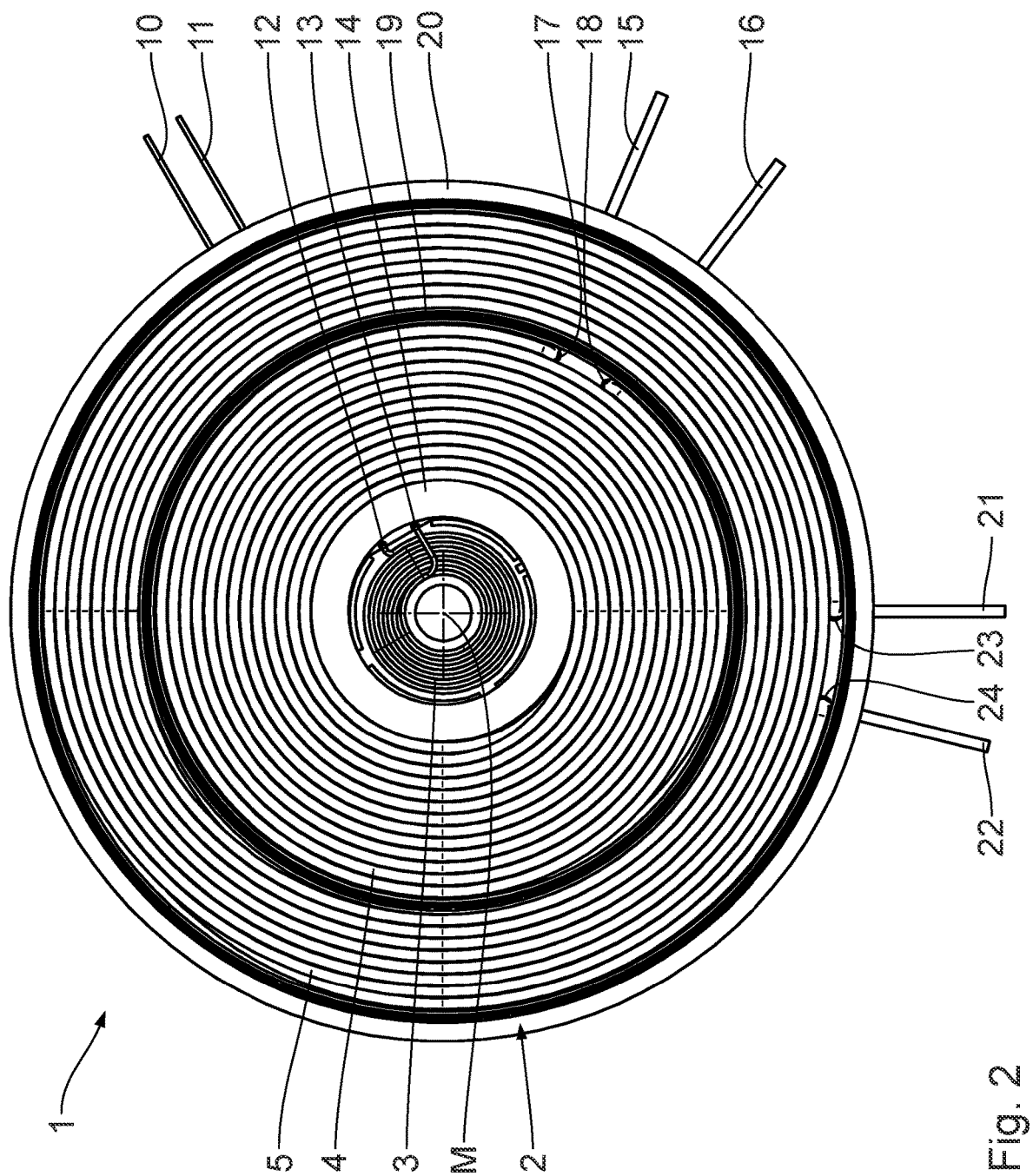
FIG. 2 is a plan view of an upper face of the inductor with three coils arranged on a coil carrier and with a one-piece core.
Figure 3:
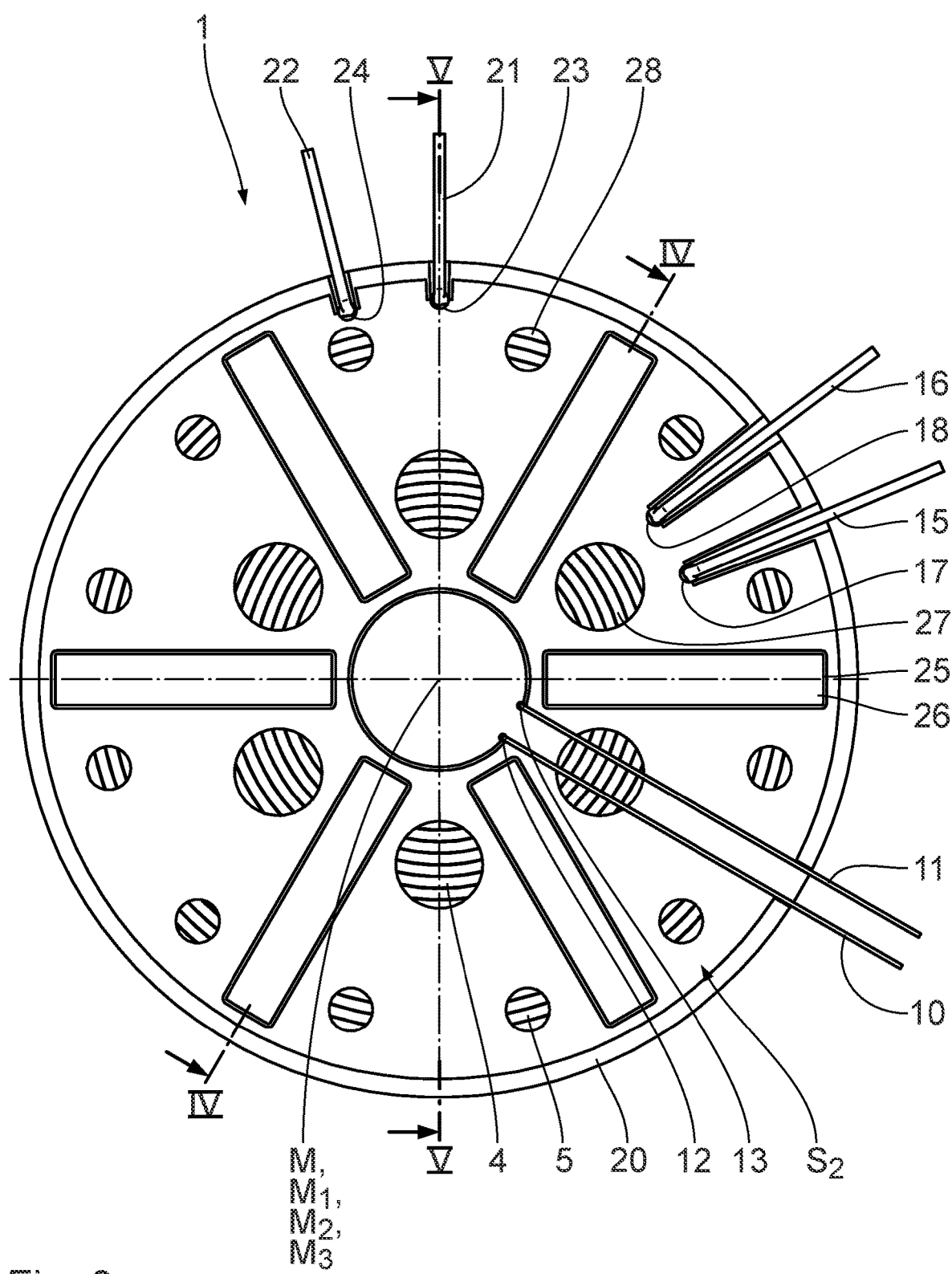
FIG. 3 is a plan view of a lower face of the coil carrier with a plurality of magnetic rods.
Figure 4:
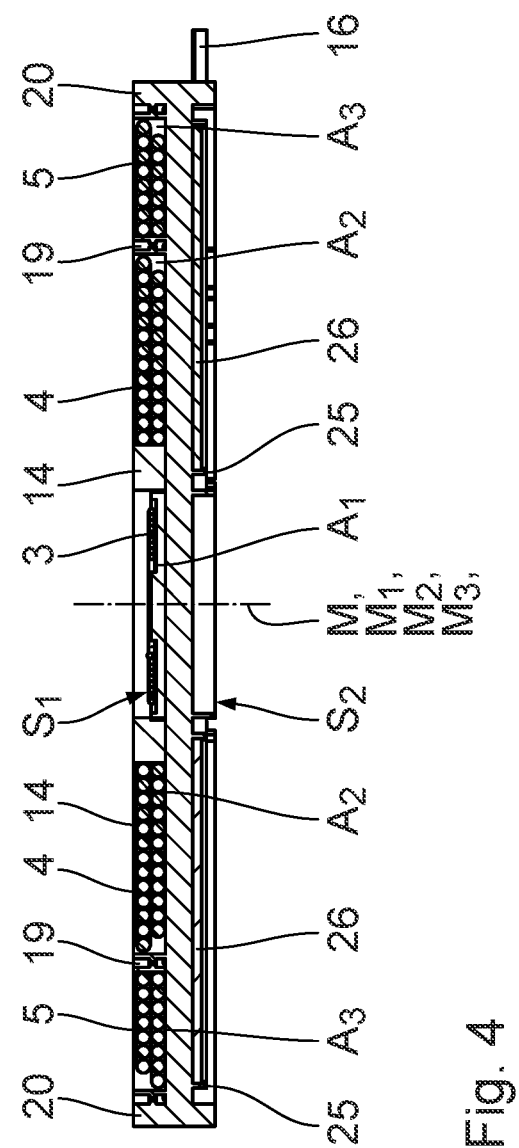
FIG. 4 is a first sectional view through the inductor along the cut line IV-IV in FIG. 3.
Figure 5:
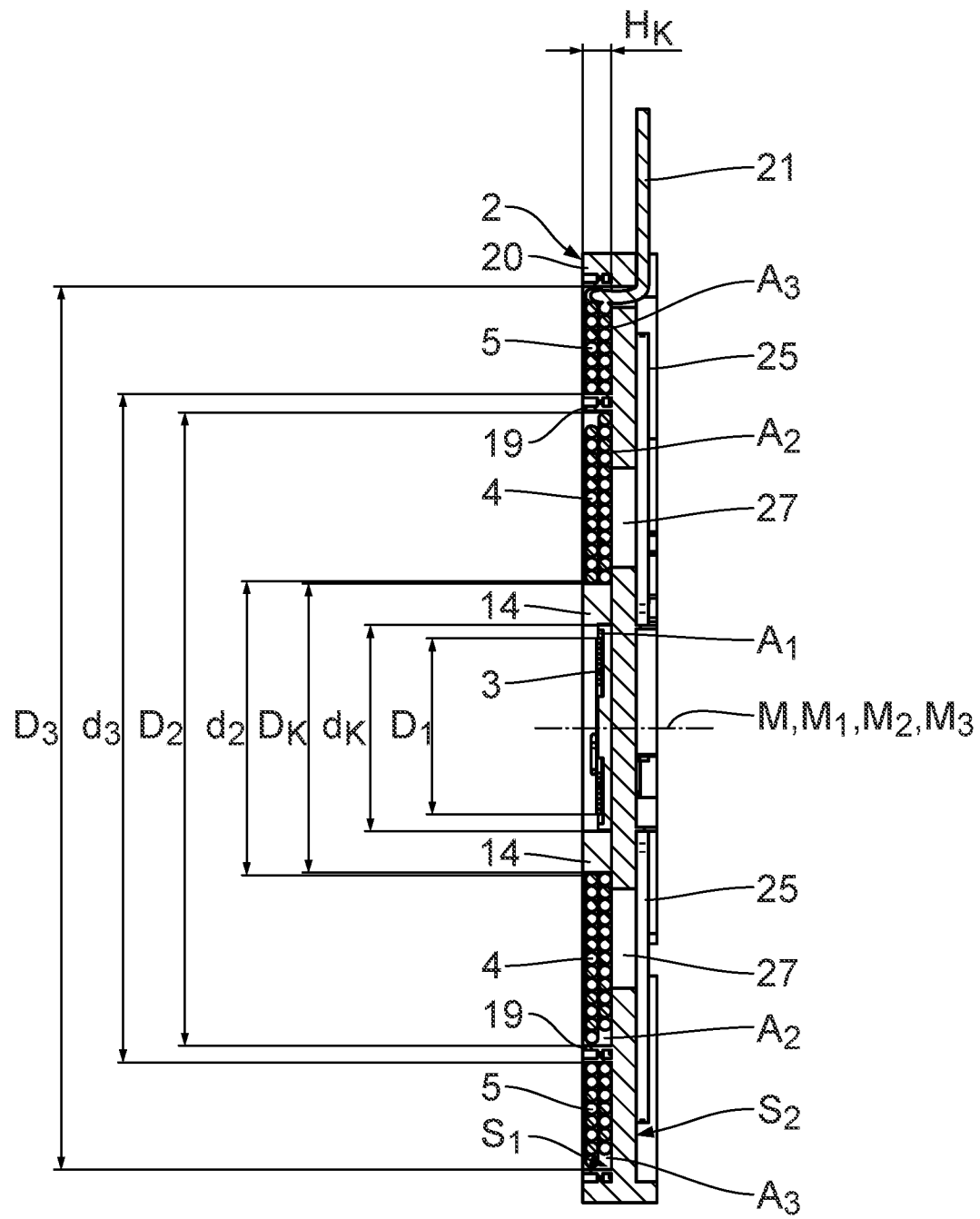
FIG. 5 is a second sectional view through the inductor along the cut line V-V in FIG. 3.
Figure 6:
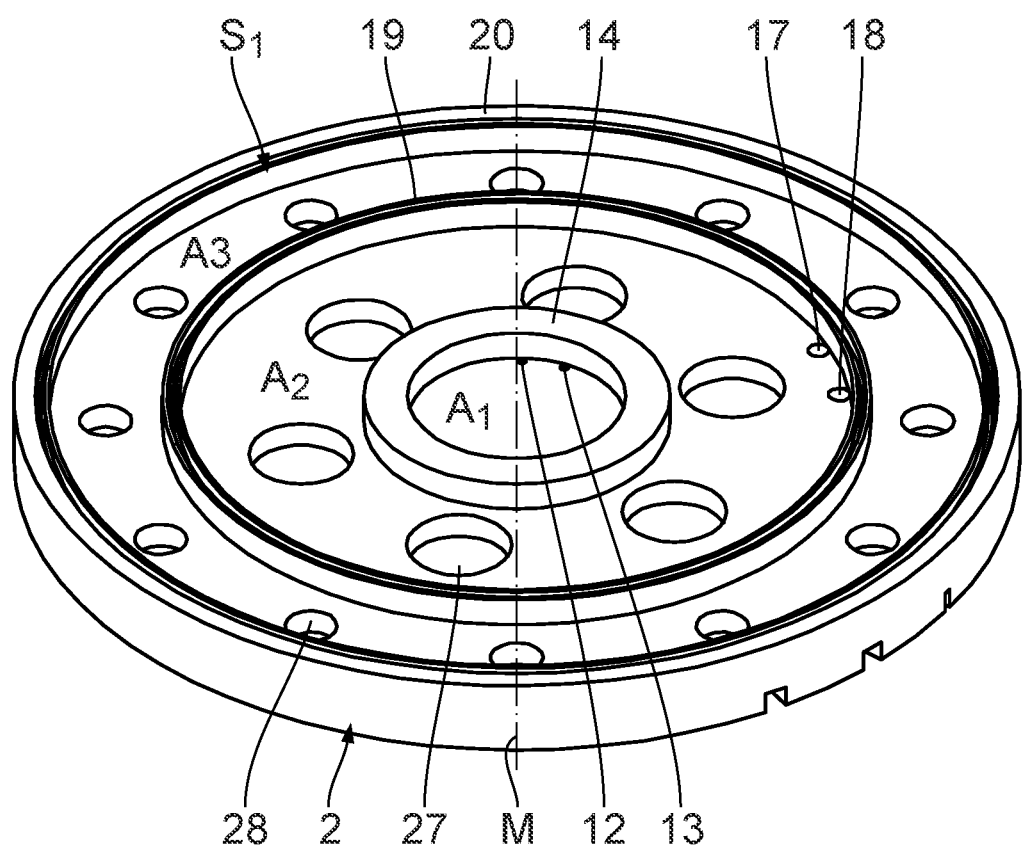
FIG. 6 is a perspective view of the coil carrier without the coils.

A first exemplary embodiment of the invention is described below with reference to FIGS. 1 to 6. An inductor 1 comprises a coil carrier 2 on which three coils 3, 4, 5 are arranged. The coils 3, 4, 5 are connected to an inverter 6, that is fed through a supply network 7 with a network voltage $U_N$ and a network frequency $f_N$. The inverter 6 is controlled by a control unit 8 that has a signal connection to an input unit 9. The inductor 1 is, for example, part of an apparatus for inductively coupled energy transfer or energy supply. The inductor 1 is in particular used for applications in the domestic sector, for example in an induction cooking hob.

The coil carrier 2 is designed in the shape of a disk, and has a longitudinal center axis M. On its upper face $S_1$ the coil carrier 2 forms three receptacle regions $A_1$, $A_2$ and $A_3$ for the coils 3 to 5. The first coil 3 is arranged on the upper face $S_1$ of the coil carrier 2 in the receptacle region $A_1$. The first coil 3 is arranged concentrically to the coil carrier 2, so that a longitudinal center axis $M_1$ of the first coil 3 coincides with the longitudinal center axis M. The first coil 3 is wound spirally, and comprises two connecting wires 10, 11. The connecting wires 10, 11 are passed through associated apertures 12, 13 in the coil carrier 2 to its lower face S2, and from there to the inverter 6.

The first coil 3 is used for inductive energy transfer in a low-power range. The low-power range lies, for example, between 0 W and 200 W. The first coil 3 has, for example, the following characteristic data:
Outer diameter $D_1$=50 mm
Inductance $L_1$=6.3 µH
DC resistance $R_{1DC}$=48 mΩ

The first coil 3 is surrounded by a magnetic core 14. The magnetic core 14 thus surrounds the longitudinal center axis $M_1$ of the first coil 3. The magnetic core 14 is designed as one piece. The core 14 is designed, in particular, as an annular ferrite core.

The magnetic core 14 is arranged on the upper face $S_1$ of the coil carrier 2 between the first coil 3 and the second coil 4. The magnetic core 14 has an inner diameter $d_K$, to which the following applies: $d_K$>$D_1$.

The second coil 4 is arranged on the upper face $S_1$ of the coil carrier 2 in the receptacle region $A_2$ and surrounds the magnetic core 14. The magnetic core 14 has, for example, an outer diameter $D_K$ of 70 mm and a height $H_K$ of 5 mm.

The second coil 4 is wound spirally, and comprises connecting wires 15, 16. The connecting wires 15, 16 are passed through associated apertures 17, 18 to the lower face $S_2$ of the coil carrier 2. From there, the connecting wires 15, 16 pass to the inverter 6. The second coil 4 is arranged concentrically to the coil carrier 2, so that a longitudinal center axis $M_2$ of the second coil 4 coincides with the longitudinal center axis M of the coil carrier 2. The second receptacle region $A_2$ is bounded by an annular inner ridge 19.

The second coil 4 is used for inductive energy transfer in a high-power range. The high-power range lies, for example, between 200 W and 4.0 kW. The second coil 4 has, for example, the following characteristic data:
Inner diameter $d_2$=72 mm
Outer diameter $D_2$=140 mm
Inductance $L_2$=100 µH
DC resistance $R_{2DC}$=45 mΩ

The following also applies to the second coil 4: $d_2$>$D_K$ and thus $D_1$<$d_2$<$D_2$.

Since the first coil 3 and the second coil 4 are used for different power ranges, the control unit 8 is designed such that the first coil 3 and the second coil 4 can be operated independently of one another. This means that exclusively either the first coil 3 or the second coil 4 can be operated.

The third coil 5 is arranged on the upper face $S_1$ of the coil carrier 2 in the receptacle region $A_3$ and surrounds the second coil 4 and the annular inner ridge 19. The receptacle region $A_3$ is bounded by the annular inner ridge 19 and by an annular outer ridge 20.

The third coil 5 is wound spirally, and comprises connecting wires 21, 22. The connecting wires 21, 22 are passed through associated apertures 23, 24 at the lower face $S_2$ of the coil carrier 2. From there, the connecting wires 21, 22 pass to the inverter 6. The third coil 5 is arranged concentrically to the coil carrier 2, so that a longitudinal center axis $M_3$ of the third coil 5 coincides with the longitudinal center axis M of the coil carrier 2.

The third coil 5 is used for inductive energy transfer in the high-power range. The third coil 5 has, for example, the following characteristic data:
Inner diameter $d_3$=180 mm
Outer diameter $D_3$=214 mm
Inductance $L_3$=60 µH
DC resistance $R_{3DC}$=45 mΩ

Since the third coil 5 surrounds the second coil 4, it follows that $d_3$>$D_2$.

The coils 3, 4, 5 can be wound spirally in a single plane or a plurality of planes. In the present exemplary embodiment, the coils 3, 4, 5 are each wound spirally in two planes. The coils 3, 4, 5 have a constant winding density in the radial direction.

The third coil 5 is preferably operable exclusively depending on the second coil 4, for example in that the third coil 5 is connected when necessary in parallel or in series with the second coil 4. For example, the second coil 4 only covers a first partial region of the high-power range, so that through the additional operation of the third coil 5, a remaining second partial range of the high-power range can be covered. The control unit 8 is accordingly so designed that the third coil 5 is exclusively operable depending on the second coil 4. The third coil 5 is, corresponding to the second coil 4, operable independently of the first coil 3. Otherwise expressed, the first coil 3 is operable independently of the coils 4 and 5.

A plurality of receptacles 25 are designed at the coil carrier 2 on the lower face $S_2$, running underneath the receptacle regions $A_2$ and $A_3$ radially to the longitudinal center axis M or $M_1$. Magnetic rods 26, designed in particular as ferrite rods, are arranged in the receptacles 25. The rods 26 extend outside the receptacle region $A_1$ of the first coil 3 into the receptacle regions $A_2$ and $A_3$ of the coils 4, 5.

To cool the coils 4, 5 the coil carrier 2 comprises a plurality of apertures 27, 28 in the receptacle regions $A_2$ and $A_3$. The apertures 27, 28 are designed for example with a circular and/or slot shape. The apertures 28 designed in the receptacle region $A_3$ have, for example, a smaller diameter than those in the apertures 27 designed in the receptacle region $A_2$.

The manner in which the inductor 1 functions is as follows:

When the inductor 1 is operated in the low-power range, only the first coil 3 is operated. For this purpose, the first coil 3 and the desired transferred power $P_1$ are selected by means of the input unit 9, and conveyed to the control unit 8. The control unit 8 correspondingly drives the inverter 6, and specifies the first operating frequency $F_1$ and a first voltage $U_1$ to it. On the basis of the given network frequency $f_N$ and the given network voltage $U_N$, the inverter 6 sets the operating frequency $F_1$ and the voltage $U_1$ specified by the control unit 8 at the output side of the inverter 6, i.e. the coil side. The following thus ideally applies for the output voltage $U_W$ and the output frequency $f_W$ of the inverter 6: $f_W=F_1$ and $U_W=U_1$.

The following applies to the first operating frequency $F_1$: 100 kHz≤$F_1$≤220 kHz, in particular 100 kHz≤$F_1$≤210 Hz, and in particular 120 kHz≤$F_1$≤200 kHz.

The first coil 3 can be operated in the low-power range between 0 W and 200 W, so that, for example, a portable device, such as for example a mobile telephone, a smart watch, a fitness tracker, a digital camera, a baby monitor, a radio or a remote control unit can be inductively charged with the first coil 3.

The field lines generated by the first coil 3 are guided through the magnetic core 14, and the stray field is reduced, whereby a high efficiency of the inductive energy transfer is achieved. When the first coil 3 is in operation, the second coil 4 and/or the third coil 5 are not simultaneously operated.

When the inductor 1 is operated in the high-power range, the second coil 4 and, if relevant, also the third coil 5 are operated. For this purpose, the coil 4 and the desired transferred power $P_2$ are selected by means of the input unit 9, and conveyed to the control unit 8. The control unit 8 correspondingly drives the inverter 6, and specifies the second operating frequency $F_2$ and a second voltage $U_2$ to it. The inverter 6 sets the operating frequency $F_2$ and the voltage $U_2$, so that the following ideally applies at the output side: $f_W=F_2$ and $U_W=U_2$. The control unit 8 also specifies to the inverter 6, whether the desired power transfer $P_2$ can be achieved exclusively through operation of the second coil 4, or whether the third coil 5 is also required. If the third coil 5 is required in addition, the coils 4 and 5 are connected in parallel or in series. This is illustrated schematically in FIG. 1. The third coil 5 is thus operated, corresponding to the second coil 4, with the operating frequency $F_2$ and the voltage $U_2$.

The following applies to the second operating frequency $F_2$: 40 kHz≤$F_2$≤250 kHz, in particular 50 kHz≤$F_2$≤200 kHz, and in particular 60 kHz≤$F_2$≤120 kHz. The second operating frequency $F_2$ is, in particular, not equal to the first operating frequency $F_1$.

The magnetic core 14 in turn guides the magnetic field lines, so that the stray field is reduced. A high efficiency in the energy transfer is achieved through this. In addition, the magnetic field generated on the lower face $S_2$ is screened by the magnetic rods 26, whereby again a high efficiency is achieved. The coils 4, 5 are cooled through the apertures 27, 28. It is possible that a fan, not illustrated, is employed in addition.

Figure 7:
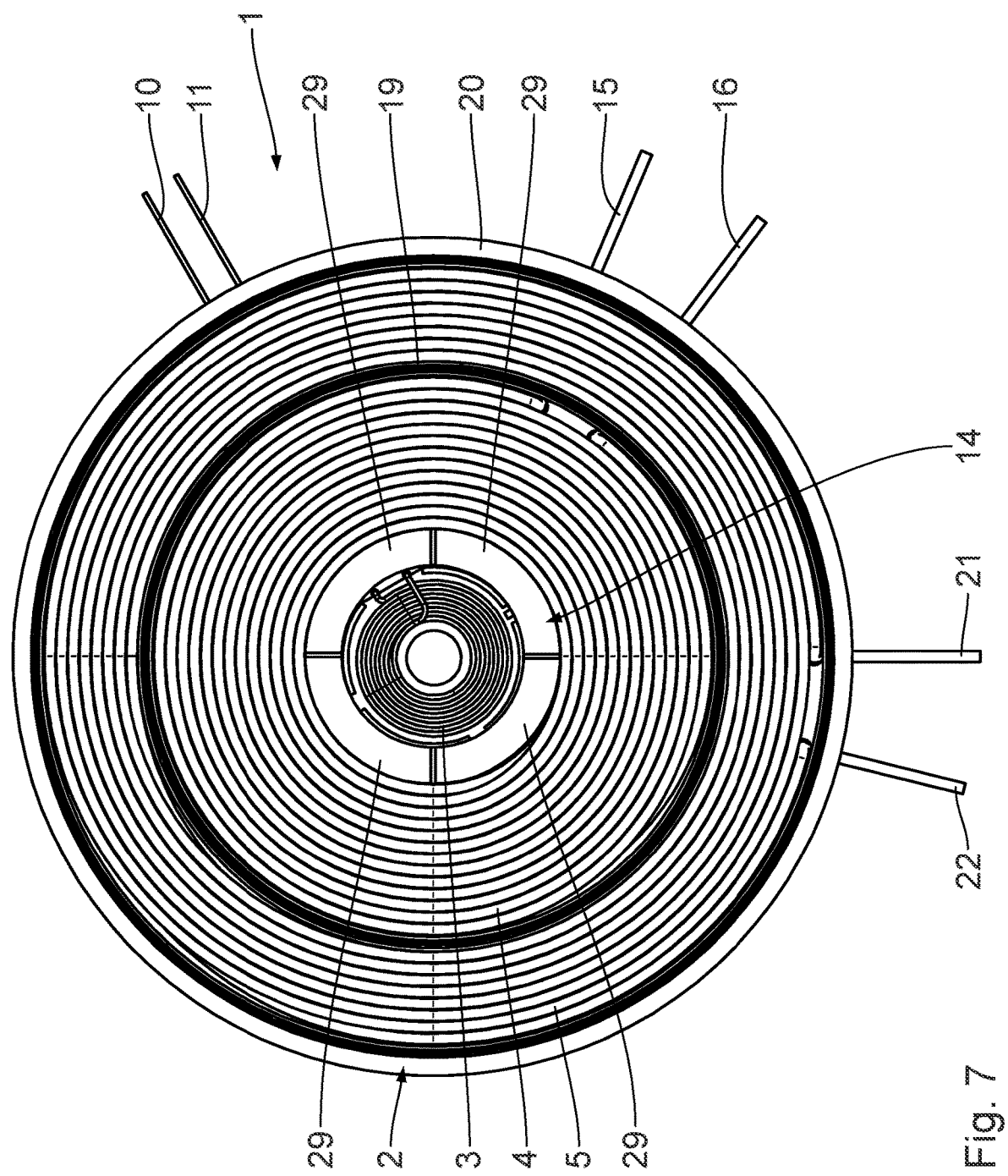
FIG. 7 is a plan view of an upper face of an inductor according to a second exemplary embodiment with a core assembled from core elements.

A second exemplary embodiment of the invention is described below with reference to FIG. 7. In contrast to the first exemplary embodiment, the magnetic core 14 is composed of a plurality of core elements 29. The core 14 is annular in design, and is composed of four quarter-arcs. Very different forms of the core 14 can be formed in a simple manner with standardized core elements 29 through the assembly of the magnetic core 14. The core elements 29 are designed in particular as ferrite core elements. Reference is made to the exemplary embodiment above in respect of the further development and further manner of functioning of the inductor 1.

The inductor 1 according to the invention permits highly varied applications in a simple and flexible manner. The first coil 3 is employed in a low-power range, for example up to 200 W, and the second coil 4, as well as, if relevant, the third coil 5, is employed in a high-power range, for example from 200 W upwards. The first coil 3 is operated exclusively in the low-power range, whereas in the high-power range, either exclusively the second coil 4 or the second coil 4 and the third coil 5 are operated together. The combination of the different coils 3, 4, 5 permits different applications with different power classes. Since the first coil 3 in the low-power range and the second coil 4, or, if relevant, in addition the third coil 5, in the high power range are never simultaneously in operation, no influence occurs in the energy transfer in the low-power range and in the high-power range. Through the combination of the magnetic core 14 and the magnetic rods 26, an efficient energy transfer through inductive coupling with low losses is enabled.

The connecting wires 10, 11 of the first coil 3 can be designed as braided wire, and can have a cross-section of from 0.1 mm$^2$ to 2.5 mm$^2$. The connecting wires 10, 11 can be sheathed with materials such as, for example, nylon, silk or foils. The connecting wires 15, 16, 21, 22 of the second and third coils 4, 5 can be designed as braided wire, and can have a cross-section of from 0.5 mm$^2$ to 5 mm$^2$. The connecting wires 15, 16, 21, 22 can be sheathed with materials such as, for example, nylon, silk or foils.

A fan can be provided for cooling the coils 4, 5. Cooling plates can be provided as an alternative or an addition. The inductor 1 can be covered by a lid on one face or on both faces. The inductor 1 can, moreover, be cast.

While specific embodiments of the invention have been shown and described in detail to illustrate the application of the principles of the invention, it will be understood that the invention may be embodied otherwise without departing from such principles.

The invention claimed is:
1. An inductor, comprising:
  a coil carrier;
  a first coil arranged on the coil carrier for energy transfer in a first power range, the first coil having a first outer diameter;
  a second coil arranged on the coil carrier for energy transfer in a second power range, the second coil having a second outer diameter, wherein the second outer diameter is larger than the first outer diameter;
  a magnetic core surrounding a longitudinal center axis of the first coil; and a control unit that is designed such that the first coil and the second coil are operated independently of one another.

2. An inductor as claimed in claim 1, wherein the control unit is configured such that the first coil is operated with a first operating frequency, the first operating frequency being greater than or equal to 100 kHZ and less than or equal to 220 kHz.

3. An inductor as claimed in claim 1, wherein the control unit is configured such that the second coil is operated with a second operating frequency, the second operating frequency being greater than or equal to 40 kHz and less than or equal to 250 kHz.

4. An inductor as claimed in claim 1, further comprising a third coil arranged on the coil carrier, the third coil having an outer diameter that is greater than the second outer diameter.

5. An inductor as claimed in claim 1, wherein the magnetic core is designed in one piece.

6. An inductor as claimed in claim 1, wherein the magnetic core is composed of a plurality of core elements.

7. An inductor as claimed in claim 1, wherein the magnetic core surrounds the first coil.

8. An inductor as claimed in claim 1, wherein at least one of the magnetic core, the first coil and the second coil are arranged on a first face of the coil carrier.

9. An inductor as claimed in claim 1, further comprising a plurality of magnetic rods that are arranged radially to the longitudinal center axis of the first coil.

10. An inductor as claimed in claim 1, wherein a plurality of magnetic rods are arranged on a second face of the coil carrier.

11. An inductor as claimed in claim 9, wherein the magnetic rods extend into a receptacle region of at least one of the second coil and a third coil.

12. An inductor as claimed in claim 1, wherein the coil carrier has a plurality of apertures for cooling at least one of the second coil and a third coil.

13. An inductor as claimed in claim 1, wherein at least one of the first coil and the second coil is spiral in design.

14. A method for the operation of an inductor, the method comprising the steps of:
providing an inductor with a first coil and a second coil, a magnetic core that surrounds a longitudinal center axis of the first coil and a control unit that is designed such that the first coil and the second coil are operated independently of one another;
operating the first coil with a first operating frequency in a first power range; and
operating the second coil independently of the first coil with a second operating frequency in a second power range.

15. An inductor as claimed in claim 7, wherein the magnetic core is arranged between the first coil and the second coil.

* * * * *